United States Patent

Back

[19]

[11] Patent Number: 5,997,435

[45] Date of Patent: Dec. 7, 1999

[54] PROCESS FOR SHIFTING A GEAR CHANGE TRANSMISSION WITHOUT SYNCHRONIZING MEMBERS

[75] Inventor: Ottmar Back, Weilheim, Germany

[73] Assignee: DaimlerChrysler AG, Stuttgart, Germany

[21] Appl. No.: 09/064,773

[22] Filed: Apr. 23, 1998

[30] Foreign Application Priority Data

Apr. 23, 1997 [DE] Germany .......................... 197 17 042

[51] Int. Cl.[6] ................................................. B60K 41/04
[52] U.S. Cl. ......................... 477/120; 477/109; 477/110; 477/124; 74/335; 74/336 R
[58] Field of Search .................... 477/107, 109, 477/110, 111, 120, 124; 74/335, 336

[56] References Cited

U.S. PATENT DOCUMENTS

| | | | |
|---|---|---|---|
| 4,905,806 | 3/1990 | Hillenbrand et al. | 192/53.343 |
| 5,301,565 | 4/1994 | Weismann et al. | 477/107 |
| 5,508,916 | 4/1996 | Markyvech et al. | 364/424.1 |
| 5,688,205 | 11/1997 | Buhler | 74/336 R |
| 5,827,148 | 10/1998 | Seto et al. | 74/336 R |

FOREIGN PATENT DOCUMENTS

| | | |
|---|---|---|
| 0 490 627 A2 | 6/1992 | European Pat. Off. . |
| 195 35 131 A1 | of 0000 | Germany . |
| 35 07 565 C2 | of 0000 | Germany . |
| 35 13 279 A1 | 10/1985 | Germany . |
| 35 07 565 A1 | 9/1993 | Germany . |
| 56-154148 | 11/1981 | Japan . |
| 61-285142 | 12/1986 | Japan . |

OTHER PUBLICATIONS

Office Action of Japanese Patent Application 148 212/1998, Dec. 8, 1998.

*Primary Examiner*—Charles A Marmor
*Assistant Examiner*—Tisha D. Waddell
*Attorney, Agent, or Firm*—Evenson McKeown Edwards & Lenahan P.L.L.C.

[57] ABSTRACT

A process is described for shifting a gear change transmission which has no synchronizing members. A defined rotational speed difference is adjusted at the gear clutches in the range of the synchronous rotational speed. Thereby engaging flanks of the clutch halves which are always situated opposite to one another in the same rotating direction come in contact during the shifting.

16 Claims, 3 Drawing Sheets

PROCESS FOR SHIFTING A GEAR CHANGE TRANSMISSION WITHOUT SYNCHRONIZING MEMBERS

BACKGROUND AND SUMMARY OF THE INVENTION

This application claims the priority of German application 197 17 042.0, filed Apr. 23, 1997, the disclosure of which is expressly incorporated by reference herein.

The present invention relates to a process for shifting a gear change transmission having no synchronizing members, and more particularly, to a process for shifting a gear change transmission having no synchronizing member from an old gear into a new gear without the interruption of the drive connection between the gear change transmission and an internal-combustion engine used as the driving engine and using form-locking gear clutches for coupling a respective gearwheel to its transmission shaft. In a process step triggered by a shifting signal, first the engine torque is reduced and then the gear clutch of the old gear is disengaged, and, in a further process step, when the old gear is disengaged, the rotational engine speed is changed in the direction of the synchronous rotational speed pertaining to the new gear, and, in a further process step, the rotational engine speed—if it is within the range of the synchronous rotational speed—is maintained at a significant value for a defined time period and, in this time period, the gear clutch of the new gear is engaged.

DE 35 07 565 C2 describes a device which operates for establishing the synchronous running of a position change transmission having no shifting clutch members and no synchronizing members for a vehicle, such as a motor vehicle, equipped with an internal-combustion engine as the driving engine. The device is equipped with at least one system for influencing the torque output of the internal-combustion engine, a transmission control unit and means for determining the synchronous point of the position change transmission. During gear shifting, the rotational speed of the internal-combustion engine is changed after the disengagement of the old gear to the rotational speed corresponding to the new gear and, when the synchronous point is reached, the new transmission gear is engaged.

In order to avoid the engagement of the preselected gear from taking place before the synchronous point of the transmission members to be coupled has already clearly been exceeded because the entire arrangement and particularly the mechanical devices for the gear shifting generally are subject to inertia, and in order to thus permit a comfortable, no-jolt engaging of a new transmission gear without the aid of special mechanical synchronizing members, the known device uses a method of operation such that, when the synchronous point is achieved, the torque influencing device can abruptly be acted upon for adjusting such a low torque of the internal-combustion engine that the rotational speed of the internal-combustion engine remains constant or changes only slightly.

An object of the present invention is to keep the shifting forces for engaging the form-locking gear clutches required as low as possible. According to the present invention, this object has been advantageously achieved by providing a process wherein in the process step triggered by the shifting signal, the engine torque is first raised in the coasting operation, and in that the significant value of the engine rotational speed is assigned to a defined rotational speed difference at the gear clutches such that the respective drive-side clutch half, during all shifts, either always has the higher or always has the lower rotational speed with respect to the rotational speed of the output-side clutch half.

During each gear change in the process of the present invention, only one and the same of the two engaging flanks of a clutch tooth of a clutch half of the participating gear clutch can come in contact with an engaging flank of the other clutch half which is adjacent in the circumferential direction. Thereby, a symmetrical chamfering angle or chamfering angles on the two engaging flanks of a clutch tooth is or are no longer required. Such a chamfering angle always results in an axial force component which limits the shifting comfort.

Therefore, in the process according to the present invention, the use of gear clutches, in which one engaging flank of a clutch tooth is situated completely in a plane containing the clutch axis, has been found advantageous.

In the process according to the invention, the synchronous rotational speed can be adjusted such that a residual differential rotational speed remains, specifically such that the rotational speed of the engine-side transmission elements (gear wheel) is higher than the rotational speed of the output-side transmission elements (clutch sleeve). Advantageously, these differential rotational speeds are between 10 min$^{-1}$ and 40 min$^{-1}$.

In the process of the invention, the shifting of the respective gear wheel clutch always takes place such that the same engaging flanks of the clutch teeth strike against one another, irrespective of whether it is an upshift or a downshift.

Thus the engaging flanks of the respective clutch tooth can be configured such that one engaging flank has no chamfering angle, and the other engaging flank is provided with a chamfering angle. Thereby, the clutch teeth of the two clutch halves always strike against one another with the straight engaging flanks and, as a result, only circumferential forces are generated which reduce the remaining differential rotational speed. No axial forces are generated which would counteract the shifting force. The chamfering angle of the second engaging flank permits an axial engaging of the clutch teeth when sweeping over the differential angle between two opposite clutch teeth.

The present invention also relates to a testing step for initiating or terminating a process step under defined conditions.

BRIEF DESCRIPTION OF THE DRAWINGS

Other objects, advantages and novel features of the present invention will become apparent from the following detailed description of the invention when considered in conjunction with the accompanying drawings wherein.

DETAILED DESCRIPTION OF THE DRAWINGS

Figure 1:
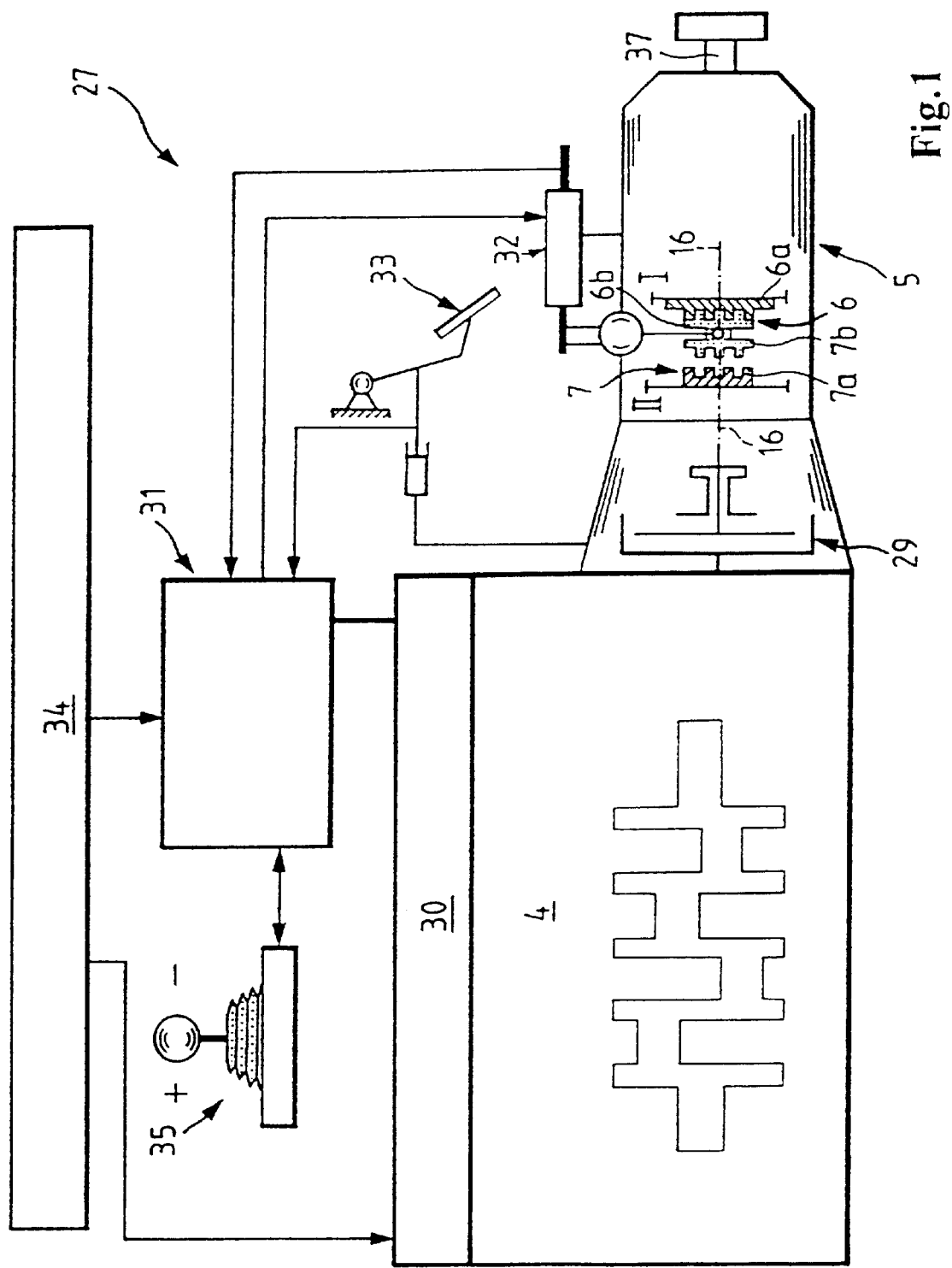
FIG. 1 is a schematic view of a drive assembly of a motor vehicle with a gear change transmission without synchronizing members, which transmission is shifted according to the process of the present invention.

With reference to FIG. 1, a motor vehicle has a drive arrangement designated generally by numeral 27 which consists essentially of a driving engine 4 (e.g., internal-combustion engine), a clutch 29 and a gear change transmission 5 which has no synchronizing members. An electronic engine timing unit 30 for controlling the injection quantity, the engine brake, etc., an electronic transmission control 31 for controlling the selection control elements and the shifting control elements 32 as well as a clutch pedal for operating the clutch 29 are used for controlling this drive arrangement. The clutch 29 is operated only for starting and stopping the vehicle. As an alternative to an operation by the driver, an automatic clutch operation may also be used.

The communication between the engine control unit 30 and the transmission control unit 31 takes place via a data bus (CAN) 34. The connection to the driver takes place by way of a generator unit 35 which gives commands for an upshifting or downshifting to the transmission control 31.

The gear change in the gear change transmission 5 takes place by engaging and disengaging gear clutches 6, 7 which have no synchronizing members and are assigned to the respective gears (I, II). The adjustment of the synchronous rotational speed pertaining to the respective new gear (II) to be shifted takes place by way of the driving engine 4 whose control elements receive corresponding commands from the engine timing unit 30. The permissibility of the gear change desired by the driver is checked in the transmission control unit 31.

For shifting the gear change transmission 5 from an old gear I into a new gear II, an intervention into the engine control unit 30 is carried out without operating the vehicle clutch 29. Specifically, for disengaging the old gear (I), while reducing the torque in the coasting operation and increasing the torque in the coasting operation, the intervention adjusts the engine torque $M_{engine}$ such that the gear clutch 6 of the old gear (I) can be disengaged, and for adjusting the synchronous rotational speed of the new gear (II), the intervention raises and lowers the rotational engine speed $n_{engine}$ so that, at only a low differential rotational speed 13 (FIG. 2 $_{(a)\ to\ (d)}$), the gear clutch 7 of the new gear (II) can be engaged.

For upshifting (II>I), the synchronous rotational speed is reached by reducing the fuel injection quantity and possibly by operating the engine brake, and for downshifting (I→II), the synchronous rotational speed is reached by increasing the fuel injection quantity.

Figure 2:
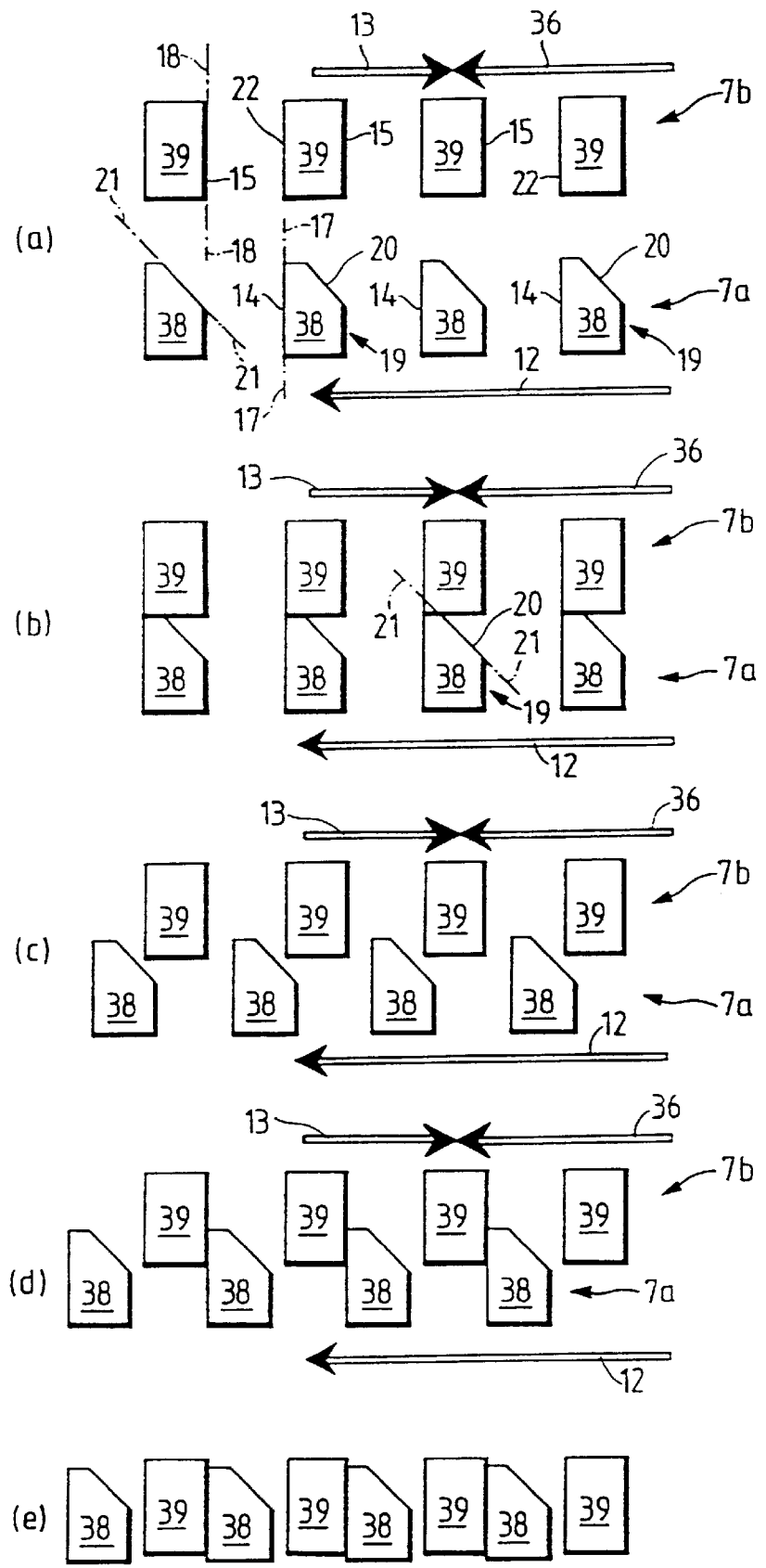
FIG. 2 is a schematic view of five shifting phases (a) to (e) of a shifting operation in the gear shifting transmission of FIG. 1 by way of the respective mutual position of clutch teeth of the two clutch halves of the gear clutch of the new gear.

As seen in FIG. 2, the synchronous rotational speed is adjusted such that a residual differential rotational speed 13 remains. That is, the rotational speed 12 of the engine-side transmission elements (thus, of the clutch half 7a connected with the gearwheel of the near gear (II)) is higher than the rotational speed 36 of the output-side transmission elements (thus, of the clutch half 7b which is non-rotatably and axially displaceably disposed on the transmission output shaft 37 and is connected with the shifting clutch sleeve). Differential rotational speeds between 10 $min^{-1}$ and 40 $min^{-1}$ were found to be advantageous for the intended purpose. The differential rotational speed 13 of the respective gear clutch during the engaging is determining for the engaging time and the jolt generated during the impacting of the tooth flanks.

The engaging time depends on how long it takes before a sweeping over the differential angle 13 of two teeth has taken place and these can then strike on one another. The larger the differential rotational speed, the shorter the engaging time. During the impacting of the teeth, a jolt is generated such that the residual differential speed is reduced. The jolt is lower with smaller differential rotational speeds.

Tests have demonstrated that differential rotational speeds situated in the range of 10 $min^{-1}$ and 40 $min^{-1}$ are typical of acceptable short engaging times and low jolts.

In the above-described manner, the engagement of the gear clutch 7 of the new gear (II) thus always takes place such that the same engaging flanks 14 of the clutch teeth 38 of one clutch half 7a come in contact with the same engaging flanks 15 of the clutch teeth 39 of the other clutch half 7b, specifically independently of whether it is an upshift or a downshift. Thus the clutch teeth 38 of one clutch half 7a may have one straight engaging flank 14 without any chamfering angle and one flank 19 with a chamfering angle 20 while the clutch teeth 39 of the other clutch half 7b are provided with an engaging flank 15 without a chamfering angle for the contact with a corresponding engaging flank 14 of one clutch half 7a.

The present invention thereby provides that the clutch teeth 38 of one clutch half 7a always strike with their straight engaging flanks 14 without a chamfering angle on a respective straight engaging flank 15 without a chamfering angle of a clutch tooth 39 of the other clutch half 7b. Only circumferential forces are generated which reduce the residual differential rotational speed, and no axial forces are generated which would counteract the shifting force. The chamfering angle 20 of the second flank 19 permits an axial engagement of the clutch teeth 38, 39 during the sweeping over the differential angle between two opposite clutch teeth.

Shifting phase (a) in FIG. 2 illustrates the mutual position of the clutch teeth 38/39 when the shifting clutch sleeve with the clutch halves 6b, 7b is in its neutral position in which both gear clutches 6 and 7 are disengaged.

Shifting phase (b) in FIG. 2 illustrates an accidental contact position of the clutch teeth 38, 39 which may occur when the shift clutch sleeve with the clutch halves 6b, 7b is operated from the neutral position of FIG. $2_{(a)}$ in the direction of the clutch half 7a connected with the gear wheel of the new gear (II).

Shifting phase (c) in FIG. 2 illustrates the clutch teeth 38, 39 in an intermediate position which may occur during the axial engagement of the clutch teeth 39 into the clutch toothing 38 of the clutch half 7a, which engagement is facilitated by the chamfering angle 20 of the flanks 19 of the clutch teeth 38.

While the straight engaging flanks 14 and 15 are each situated in a plane 17—17 or 18—18 of the respective clutch tooth 38 or 39 containing the clutch axis 16—16, the chamfering angles 20 are each provided in a plane 21—21 of the pertaining clutch tooth 38 which is sloped with respect to the clutch axis 16—16. In the case of the clutch teeth 39 of the other clutch half 7b, the second flank 22 is also situated in a plane of the respective tooth containing the clutch axis 16—16.

Shifting phase (d) in FIG. 2 illustrates the clutch teeth 38, 39 in the position in which their straight engaging flanks 14, 15, which are constructed without any chamfering angle, impact on one another in a straight manner.

Finally, shifting phase (e) in FIG. 2 illustrates the completely engaged condition of the gear clutch 7 of the new gear II with the corresponding position of the clutch teeth 38, 39.

Figure 3:
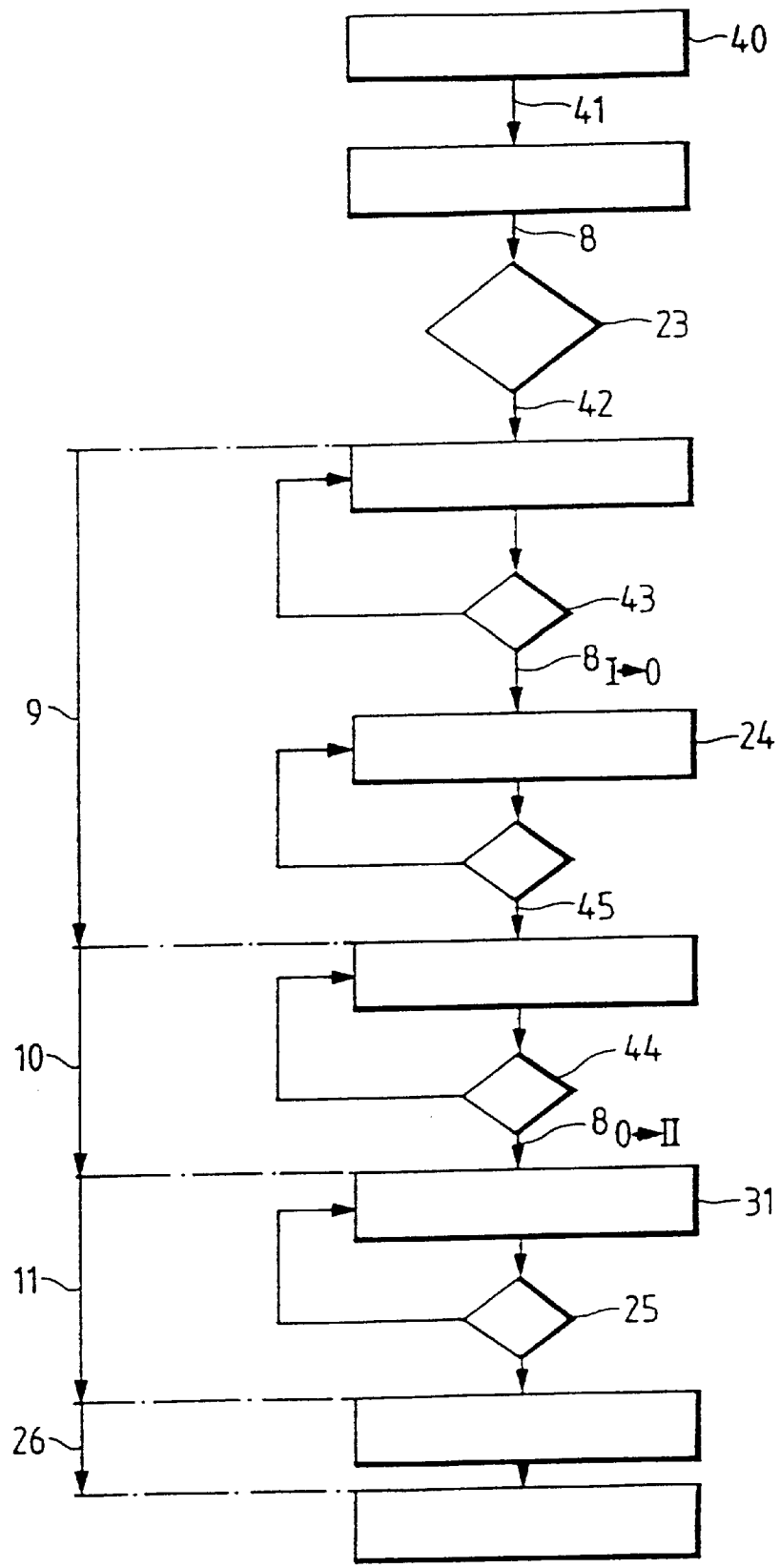
FIG. 3 is a signal flow chart for the sequence of the process according to the invention for shifting the gear change transmission of FIG. 1.

According to the signal flow chart of FIG. 3, a starting step 40 is initiated when the driver, by way of generator unit 35, expresses a shifting desire 41 for shifting from an old gear I into a new gear II. The generator unit 35 transmits the shifting desire 41 to the transmission control unit 31. The transmission control unit 31 generates a new shifting signal 8 corresponding to the new gear II, and the shifting signal 8 is tested in a first testing step 23 with respect to its reliability by way of the engine torque $M_{engine}$, engine rotational speed $n_{engine}$, and transmission output rotational speed $n_{gtr}$ parameters.

If the new gear II is recognized as being unacceptable, the shifting is denied. If, however, the permissibility of the new gear II is determined, a first process step 9 is triggered in which, by way of the data bus 34, first the command 42 is given to the engine timing unit 30 for reducing the engine torque $M_{engine}$ in the drive operation and for increasing it in the coasting operation, and a testing step 3 is then initiated in which it is tested whether the engine torque $M_{engine}$ has become to zero. When $M_{engine}=0$ is reached, the shift control element 32 of the old gear I receives the shifting command $8_{I\text{-}0}$ for disengaging the old gear I. In this event, a further testing step 24 is initiated in which it is checked whether the gear clutch 6 of the old gear I is disengaged.

If the gear clutch 6 is disengaged, another process step 10 is triggered in which, by way of the data bus 34, the command 45 is given to the engine timing unit 30 for adjusting the engine rotational speed $n_{engine}$ to the significant value. At that time, the rotational speed 12 of the drive-side clutch half 7a is by approximately the rotational speed difference 13 larger than the rotational speed 36 of the output-side clutch half 7b of the gear clutch 7 of the new gear II.

The process step 10 for controlling the rotational engine speed $n_{engine}$ to the significant value is concluded by a testing step 44 in which it is determined whether the significant value has been reached. If so, another process step 11 is triggered in which the transmission control unit 31 is caused, by way of the data bus 34 via a shifting command $8_{0\text{-}II}$, to redirect the shift control element 32 for engaging the gear clutch 7. This process step 11 is, in turn, concluded by a testing step 25 in which the position of the gear clutch 7 is monitored. If it is determined that the gear clutch 7 of the new gear II is engaged, another process step 26 is triggered for raising the engine torque $M_{engine}$ which concludes the shifting operation I→II.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Process for shifting a gear change transmission without a synchronizing member from an old gear into a new gear and without interruption of the drive connection between the gear change transmission and an engine, the transmission using form-locking gear clutches for coupling a respective gearwheel to its transmission shaft, comprising the steps of (a) generating a shifting signal to first reduce the engine torque and then disengaging the gear clutch of the old gear with the shifting signal; (b) when the old gear is disengaged, changing the rotational engine speed in a direction of the synchronous rotational speed pertaining to the new gear; and (c) when the rotational engine speed is within a synchronous rotational speed range, maintaining the rotational engine speed at a significant value for a defined time period during which the gear clutch of the new gear is engaged, wherein, step (a) further comprises the engine torque being first raised in a coasting operation, and a significant value of the rotational engine speed being assigned to a defined rotational speed difference at the gear clutches such that a respective drive-side clutch half, during all shifts, always has the higher or the lower rotational speed with respect to a rotational speed of the output-side clutch half.

2. The process according to claim 1, wherein a respective one engaging flank of one of the clutch halves which, during a shifting, comes in contact with a respective second engaging flank of the other of the clutch halves), is situated completely in a plane of its clutch half which contains a clutch axis.

3. The process according to claim 2, wherein a respective third engaging flank of a clutch half which, during a shifting, does not come in contact with a respective fourth engaging flank, adjacent in a circumferential direction, of the other clutch half, has a chamfered end section on an end thereof facing the other clutch half situated in a plane of its clutch half sloped to the clutch axis.

4. The process according to claim 1, wherein the defined rotational speed difference is from about 10 min⁻ to about 40 min⁻¹.

5. The process according to claim 4, wherein a respective one engaging flank of one of the clutch halves which, during a shifting, comes in contact with a respective second engaging flank of the other of the clutch halves, is situated completely in a plane of its clutch half which contains a clutch axis.

6. The process according to claim 5, wherein a respective third engaging flank of a clutch half which, during a shifting, does not come in contact with a respective fourth engaging flank, adjacent in a circumferential direction, of the other clutch half, has a chamfered end section on an end thereof facing the other clutch half situated in a plane of its clutch half sloped to the clutch axis.

7. The process according to claim 1, wherein, after the generating of the shifting signal and before initiating the step (a) triggered by the shifting signal, a testing step is carried out in which the permissibility of shifting is tested by the engine torque, rotational engine speed transmission output rotational speed parameters.

8. The process according to claim 7, wherein a respective one engaging flank of one of the clutch halves which, during a shifting, comes in contact with a respective second engaging flank of the other of the clutch halves, is situated completely in a plane of its clutch half which contains a clutch axis.

9. The process according to claim 8, wherein a respective third engaging flank of a clutch half which, during a shifting, does not come in contact with a respective fourth engaging flank, adjacent in a circumferential direction, of the other clutch half, has a chamfered end section on an end thereof facing the other clutch half situated in a plane of its clutch half sloped to the clutch axis.

10. The process according to claim 1, wherein the defined rotational speed difference is from about 10 min⁻¹ to about 40 min⁻¹.

11. The process according to claim 1, wherein the step (a) triggered by the shifting signal is concluded by a testing step for monitoring a position of the gear clutch of the old gear when the gear clutch is in a disengaged position.

12. The process according to claim 11, wherein a respective one engaging flank of one of the clutch halves which, during a shifting, comes in contact with a respective second engaging flank of the other of the clutch halves, is situated completely in a plane of its clutch half which contains a clutch axis.

13. The process according to claim 12, wherein a respective third engaging flank of a clutch half which, during a shifting, does not come in contact with a respective fourth engaging flank, adjacent in a circumferential direction, of the other clutch half, has a chamfered end section on an end thereof facing the other clutch half situated in a plane of its clutch half sloped to the clutch axis.

14. The process according to claim 13, wherein the defined rotational speed difference is from about 10 min$^{-1}$ to about 40 min$^{-1}$.

15. The process according to claim 14, wherein, after the generating of the shifting signal and before initiating the step (a) triggered by the shifting signal, a testing step is carried out in which the permissibility of shifting is tested by the engine torque, rotational engine speed transmission output rotational speed parameters.

16. The process according to claim 1, wherein the step (c) for engaging a gear clutch of the new gear is concluded by a testing step for monitoring a position of the engaged gear clutch, and with the conclusion of step (c), another step is triggered for increasing the engine torque.

* * * * *